United States Patent
Sullivan et al.

(10) Patent No.: US 7,321,948 B1
(45) Date of Patent: Jan. 22, 2008

(54) HIGHLY AVAILABLE SYSTEM TEST MECHANISM

(75) Inventors: Douglas Sullivan, Hopkinton, MA (US); Brandon Barney, Hudson, MA (US)

(73) Assignee: EMC Corporation, Hopkinton, MA (US)

( * ) Notice: Subject to any disclaimer, the term of this patent is extended or adjusted under 35 U.S.C. 154(b) by 143 days.

(21) Appl. No.: 11/094,050

(22) Filed: Mar. 30, 2005

(51) Int. Cl.
*G06F 13/14* (2006.01)
*G06F 11/00* (2006.01)

(52) U.S. Cl. .................................... 710/305; 714/709

(58) Field of Classification Search .............. 710/305; 324/537, 767; 340/514, 660–663; 714/43, 714/709
See application file for complete search history.

(56) References Cited

U.S. PATENT DOCUMENTS

| | | | | |
|---|---|---|---|---|
| 4,371,952 A | * | 2/1983 | Schuck | 714/27 |
| 4,729,124 A | * | 3/1988 | Hansel et al. | 714/31 |
| 4,757,503 A | * | 7/1988 | Hayes et al. | 714/718 |
| 4,951,283 A | * | 8/1990 | Mastrocola et al. | 714/43 |
| 6,170,078 B1 | * | 1/2001 | Erle et al. | 716/4 |
| 6,530,033 B1 | * | 3/2003 | Raynham et al. | 714/5 |
| 6,738,268 B1 | | 5/2004 | Sullivan et al. | 363/49 |
| 6,862,200 B2 | | 3/2005 | Sullivan et al. | 363/65 |
| 6,909,052 B1 | | 6/2005 | Haug et al. | 174/255 |
| 6,967,487 B2 | * | 11/2005 | Garnett | 324/537 |
| 7,058,835 B1 | | 6/2006 | Sullivan et al. | 713/324 |
| 7,216,270 B1 | * | 5/2007 | Jacobson et al. | 714/718 |
| 2004/0267482 A1 | * | 12/2004 | Robertson et al. | 702/118 |

\* cited by examiner

*Primary Examiner*—Glenn A. Auve
*Assistant Examiner*—Trisha Vu
(74) *Attorney, Agent, or Firm*—BainwoodHuang

(57) ABSTRACT

Boards in a system are interconnected by a first set of signals including a first control signal and first function signals. Each board in the system includes a second set of signals corresponding to the first set of signals. When the first control signal and a first function signal are asserted, the corresponding second signals of are asserted in response and a function is performed on the boards. But, if any of the second signals are asserted, none of the first signals is asserted in response. Test signals on boards are thereby isolated from test signals coupled to all the boards on the system, so a fault on any signal in any second set of signals will not propagate to the first set of signals.

20 Claims, 4 Drawing Sheets

HIGHLY AVAILABLE SYSTEM TEST MECHANISM

FIELD OF THE INVENTION

The present invention relates generally to field of electronic systems, and particularly to highly available mechanisms for testing and identifying one or more boards in an electronic system.

BACKGROUND OF THE INVENTION

Today's networked computing environments are used in businesses for generating and storing large amounts of critical data. The systems used for moving, storing, and manipulating this critical data are expected to very highly reliable. "High Availability" systems employ various means for optimizing reliability.

High Availability systems are generally designed such that single points of failure are avoided in the portions of the system considered "critical". For example, multiple central processing units may provide redundancy, and multiple power supplies ensure protection against the failure of one. However, there are other parts of the system that can become single points of failure, but do not currently employ high availability mechanisms.

One area in which it would be advantageous to provide high availability is in the manufacturing test circuits used in the systems. Manufacturing test circuits are used for monitoring and testing such things as voltage margins, clock margins, fan speeds, temperature controls, and the like for the components and modules in the system. Another area in which it would be advantageous to provide high availability is in the identification circuitry used for uniquely identifying modules in the systems. If a fault occurs in the manufacturing test circuitry or in the identification circuitry, a system level fault may result. What is needed is manufacturing test and module identification circuitry that employs mechanisms for avoiding single points of failure.

SUMMARY OF THE INVENTION

In accordance with the principles of the invention, a plurality of boards in a system is interconnected by a first set of signals including a first control signal and first function signals. Each board in the system includes a second set of signals. Each second set of signals corresponds to and is coupled to the first set of signals. When the first control signal and a first function signal are asserted, the corresponding second signals of each of the second sets of signals are asserted in response and a function is performed on the plurality of boards. But, if any signal in the plurality of second sets of signals is asserted, none of the first set of signals is asserted in response.

More particularly, the first and second sets of signals are coupled via electrically isolating devices that isolate activity on the second set of signals from the first set of signals. Such a device may be for example a diode.

In accordance with an implementation, the first set of signals interconnects the plurality of boards via a midplane. The function signals are test signals, and the function is a test function. The first set of signals is used to test all the boards in the system. Each second set of signals can be used to test an individual board. Advantageously, a fault on any signal in any second set of signals will not propagate to the first set of signals.

In accordance with another aspect of the invention, a system includes a plurality of boards. A first set of identifying signals is provided for identifying the first board. The first set of identifying signals is capable of encoding a first valid state and one or more invalid states. A second set of identifying signals is provided for identifying the second board. The second set of identifying signals is capable of encoding a second valid state and one or more invalid states. If a fault occurs on any of the first set of identifying signals, an invalid state will be detected by the system, and the second board is properly identified.

The various aspects of the invention provide high availability for parts of the system such as testing and board identification, where high availability has heretofore not been considered. The robustness and reliability of the system is thereby enhanced.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
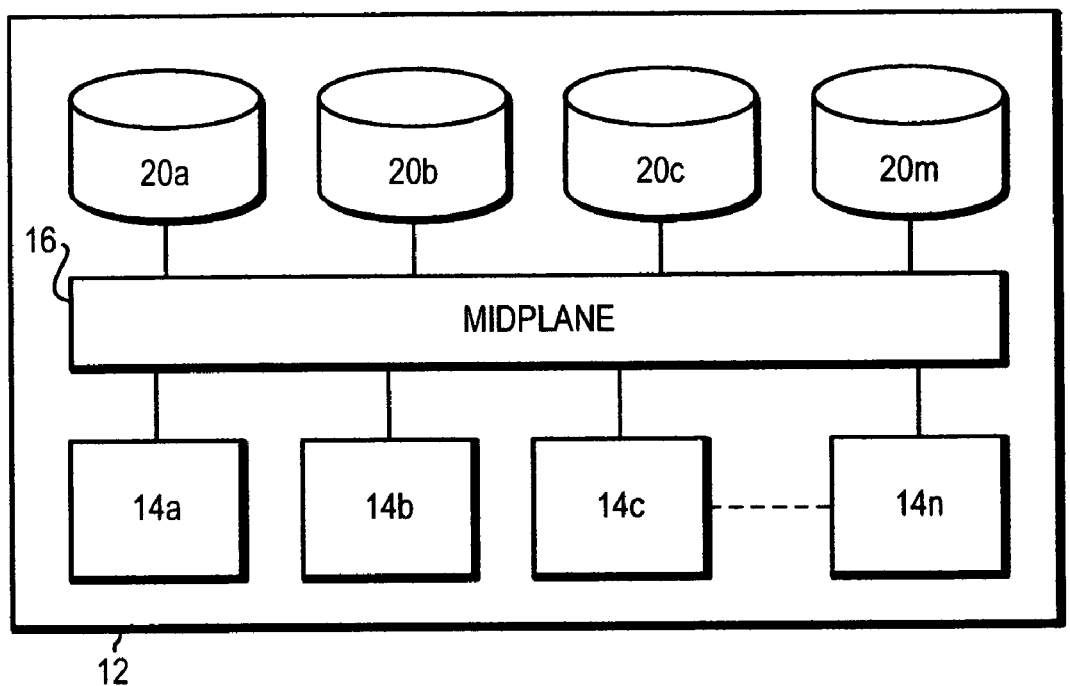
FIG. 1 is a block diagram of a system in which the invention is implemented.

The Referring to FIG. 1, there is shown a system 10 that is one of many types of systems in which the principles of the invention may be employed. The exemplary system 10 is a storage system, though it will be understood that the principles of the invention apply to all types of electronic systems, including but not limited to computer systems, networking systems, etc. The storage system 10 shown may operate stand-alone or may populate a rack including other similar systems interconnected by a midplane, backplane, or cabling to operate as a single large system.

The storage system 10 includes within a chassis 12 several boards, labeled 14a-14n, all coupled to a midplane 16. In the storage system, disk drives 20a-20m are also coupled to the midplane 16. The boards 14a-n communicate with each other and with the disk drives 20a-m via the midplane 16.

In accordance with the invention, a first set of signals interconnects the boards 14a-n via the midplane 16. The first set of signals includes a control signal and function signals. Each board 14a-n includes a second set of signals corresponding and coupled to the first set of signals. When the control signal and a function signal on the midplane 16 are asserted, the corresponding second signals are asserted in response and a function is performed on each of the boards 14a-n. Each second set of signals is isolated from the first set of signals so that assertions, or faults, on any of the second signals on any board do not propagate to the first set of signals—thus a single point of failure in the system is avoided. Furthermore, a single board can be tested without affecting the first set of signals and thus the other boards.

This aspect of the invention is particularly useful for providing high availability for test signals used in testing the boards. Thus, in the following exemplary embodiment, the control signal and function signals are used for testing purposes in a storage system. It is understood that the embodiment shown is exemplary only and that the invention can be implemented in any type of electronic system for performing a variety of functions besides testing. For example, the function, and function signals, might be related to system management rather than testing.

Figure 2:
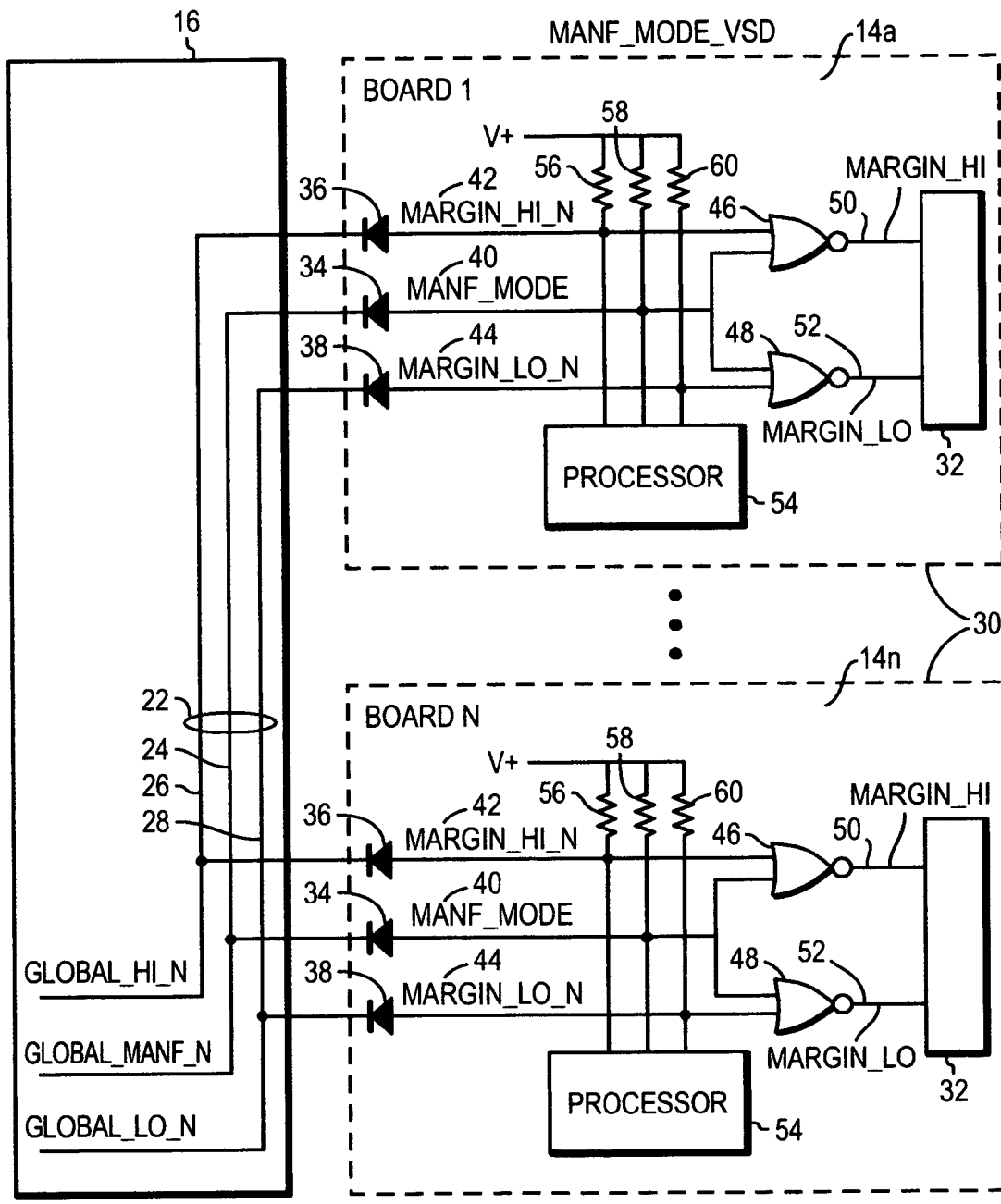
FIG. 2 is a schematic representation of the boards and midplane in the system of FIG. 1, showing highly available system function signals in accordance with the invention.

Referring now to FIG. 2, there is shown an implementation of the invention in a system wherein the function is board testing. In the example shown, signals that are asserted as active low have a "_N" suffix. It will be understood by one skilled in the art that all logical levels can be reversed and the logic adjusted to produce the same logical result.

In accordance with the invention, a first set of signals, herein test mode signals 22, are interconnected between all the boards 14a-n via the midplane 16. The test mode signals 22 include a control signal Global_Manf_N 24, and test function signals Global_Hi_N 26 and Global_Lo_N 28. Each board 14a-n is connected to the signals Global_Manf_N 24, Global_Hi_N 26, and Global_Lo_N 28 in a like manner. There is further shown a portion of the manufacturing mode circuitry 30 implemented on each board 14a-n. When system testing is performed, the Global_Manf_N signal 24 is asserted. The other two signals, Global_Hi_N 26 and Global_Lo_N 28 are then selectively asserted to cause various testing functions to occur on each board 14a-n. In the present example, the testing functions to be performed are high and low voltage margining for the voltage regulators 32 on each board, though it is understood that voltage margining is presented by example only and that other test functions, such as clock margining, fan speed testing, temperature control, and the like may be implemented. In accordance with the invention, the manufacturing mode circuitry 30 on each board 14a-n is implemented in such a way as to avoid a single point of failure in the system.

The manufacturing mode circuitry 30 on each board 14a-n is the same, so board 14a is referred to by example. The Global_Manf_N 24, Global_Hi_N 26, and Global_Lo_N 28 signals from the midplane 16 are coupled via diodes 34, 36, and 38 to signals Manf_Mode_N 40, Margin_Hi_N 42, and Margin_Lo_N 44 respectively. The diodes 34, 36, and 38 are biased from the boards 14a-n to the midplane 16. The signal Manf_Mode_N 40 is coupled as input to two NOR gates 46 and 48. The signal Margin_Hi_N 42 is coupled as the second input to the NOR gate 46. The signal Margin_Lo_N is coupled as the second input to the other NOR gate 48. The outputs of the NOR gates 46 and 48 produce signals Margin_Hi 50 and Margin_Lo 52 respectively. These signals are used for performing voltage margining on the voltage regulators 32 on the board 14a. A processor 54 is coupled to all three signals Margin_Hi_N 42, Manf_Mode_N 40, and Margin_Lo_N 44. Resistors 56, 58, and 60 pull up the signals Margin_Hi_N 42, Manf_Mode_N 40, and Margin_Lo_N 44 respectively.

When the system is not being tested, the three signals Margin_Hi_N, Manf_Mode_N and Margin_Lo_N are pulled up by their respective resistors 56, 58, and 60 to their deasserted states. Under test, either a single board can be tested, or the entire system—i.e. all boards—can be tested at once.

To test the system, the Global_Manf_N control signal 24 is asserted on the midplane 16, causing each Manf_Mode_N 40 signal on each board 14a-n to be asserted. In the example shown, the test function to be performed is voltage margining. To test high voltage margining on all the boards 14a-n, the midplane Global_Hi_N function signal 26 is asserted, causing each signal Margin_Hi_N 42 to be asserted on each board 14a-n. Since both inputs Manf_Mode_N 40 and Margin_Hi_N 42 are asserted at the NOR gate 46, the output Margin_H 50 of the NOR gate 46 is asserted. The assertion of the signal Margin_H 50 prompts the high voltage margining of the voltage regulators 32 on the boards 14a-n. Likewise, to perform low voltage margining on each board 14a-n, the midplane signals Global_Manf_N 24 and Global_Lo_N 28 are asserted. The board signals Manf_Mode_N 40 and Margin_Lo_N 44 are asserted in response, causing the assertion of the output signal Margin_Lo 52 from the NOR gate 48. In response to the assertion of Margin_Lo 52, low voltage margining of the voltage regulators 32 on each board 14a-n is performed.

In accordance with the arrangement of the invention, single points of failure are avoided. The diodes 34, 36, 38 on each board 14a-n electrically isolate the board signals Manf_Mode_N 40, Margin_Hi_N 42, and Margin_Lo_N 44 from their corresponding midplane signals Global_Manf_N 24, Global_Hi_N 26, and Global_Lo_N 28. So, if for example the signal Margin_Hi_N 42 on the board 14a is stuck in an asserted state, the Global_Hi_N 26 signal is unaffected and the remaining boards 14b-n can be tested normally. In fact, any fault on any single signal Margin_Hi_N 42, Margin_Lo_N 44, and Manf_Mode_N 40 on each board 14a-n is isolated from affecting the signals Global_Hi_N 26, Global_Lo_N 28, and Global_Manf_N 24 respectively, and is thus isolated from affecting any of the other boards. Note that, were the diodes 34, 36, and 38 not included on each board 14a-n, a single fault on any board signal would propagate across the midplane 16 and become a system level fault—i.e. a single point of failure.

Further in accordance with the invention, each board can be tested individually without affecting the rest of the system. For example, to high voltage margin the voltage regulators on the board 14a, the processor 54 can assert the Manf_Mode_N 40 and Margin_Hi_N 42 signals on the board 14a, causing the assertion of the Margin_Hi 50 signal to begin the high voltage margin testing. The diodes 34 and 36 prevent the assertion of the Margin_Hi_N signal 42 and Manf_Mode_N signal 40 from propagating to the midplane 16 and thus to the other boards 14b-n.

Furthermore, the processor 54 on each board 14a-n is capable of detecting local faults on the board test signals. For instance, if the processor 54 detects that the Manf_Mode_N signal 40 is not asserted, but the Margin_Hi_N signal 42 is asserted, it is concluded that there is a fault on the Margin_Hi_N signal 42—i.e. the Margin_Hi_N signal 42 is stuck asserted. This fault can be reported to system management software. Single faults can thus occur and be detected and reported without affecting the rest of the system 10.

Figure 3:
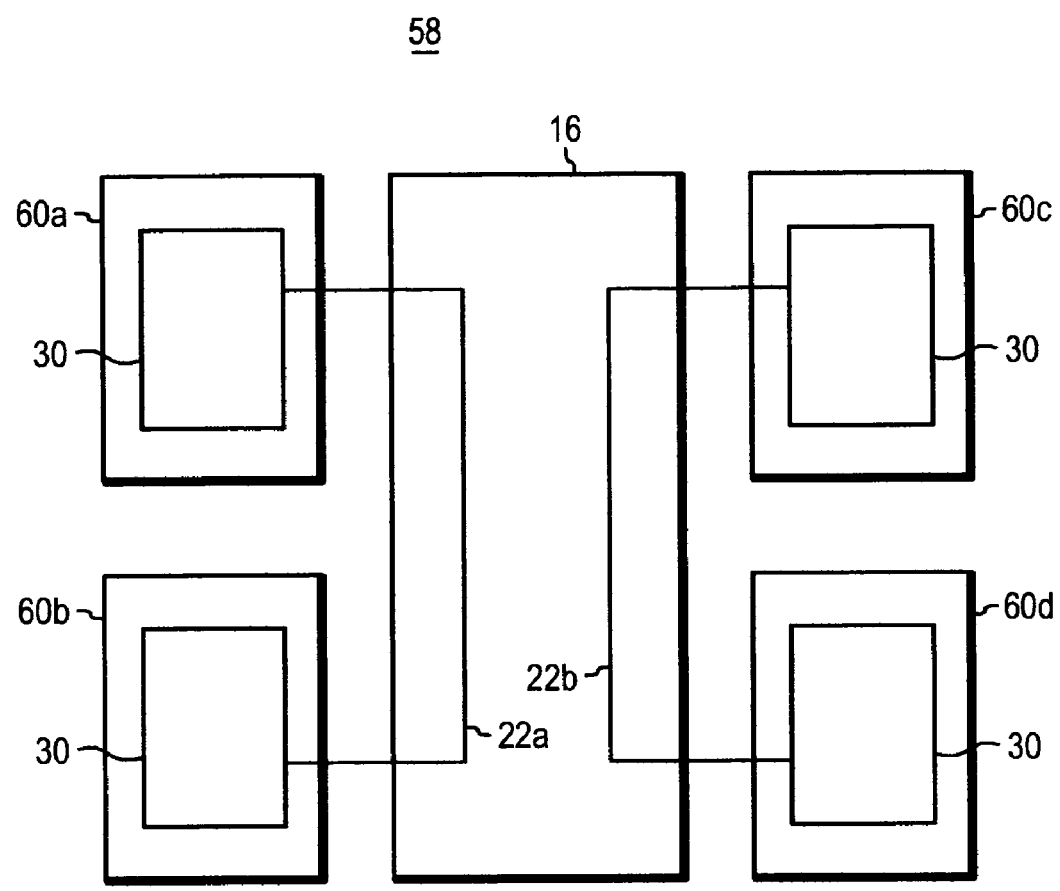
FIG. 3 is a block diagram showing a redundant implementation of the system of FIG. 2.

In accordance with a further aspect of the invention, sets of boards in the system are redundant, and the first set of control and function signals is duplicated for each set of redundant boards. For example, as shown in FIG. 3, a system 58 may include two boards 60a and 60b and two more boards 60c and 60d that are redundant to the boards 60a and 60b. Each board 60a-d includes the manufacturing mode logic 30 as shown in FIG. 2. All the boards 60a-d are interconnected via the midplane 16. In this case, the boards 60a and 60b are interconnected by a set of midplane signals 22a, while the boards 60c and 60d are interconnected by a separate set of midplane signals 22b. Each set of midplane signals 22a and 22b is a duplicate of the signals 22 in FIG. 2. In this way, a fault on midplane signal Global_Manf_N 24 in either set of midplane signals 22a or 22b can be prevented from becoming a single point of failure in the system 58. If for example the signal Global_Manf_N in the set of signals 22a suffers a stuck-at fault, the boards 60a and 60b will not function normally but the boards 60c and 60d will continue to function normally. Furthermore, all boards can monitor both Global_Manf_N signals in each set of signals 22a and 22b. Whenever they do not match, an error can be reported.

In accordance with another aspect of the invention, board identification information is encoded in a highly available manner. For purposes of management and control, each board needs to have a unique identification (ID). A known method provides a single ID bit on each board—for example a pulled up signal line. On the midplane, one board bit would be grounded. When both boards are plugged into the system, one bit would be high and the other low, giving each board its unique ID. However, if the pulled up signal line on a board suffers a fault such that it is stuck at a level, it may match the functioning ID level on the other board, rendering a system fault. The invention prevents this single point of failure by providing multiple ID signals for each board.

Figure 4:
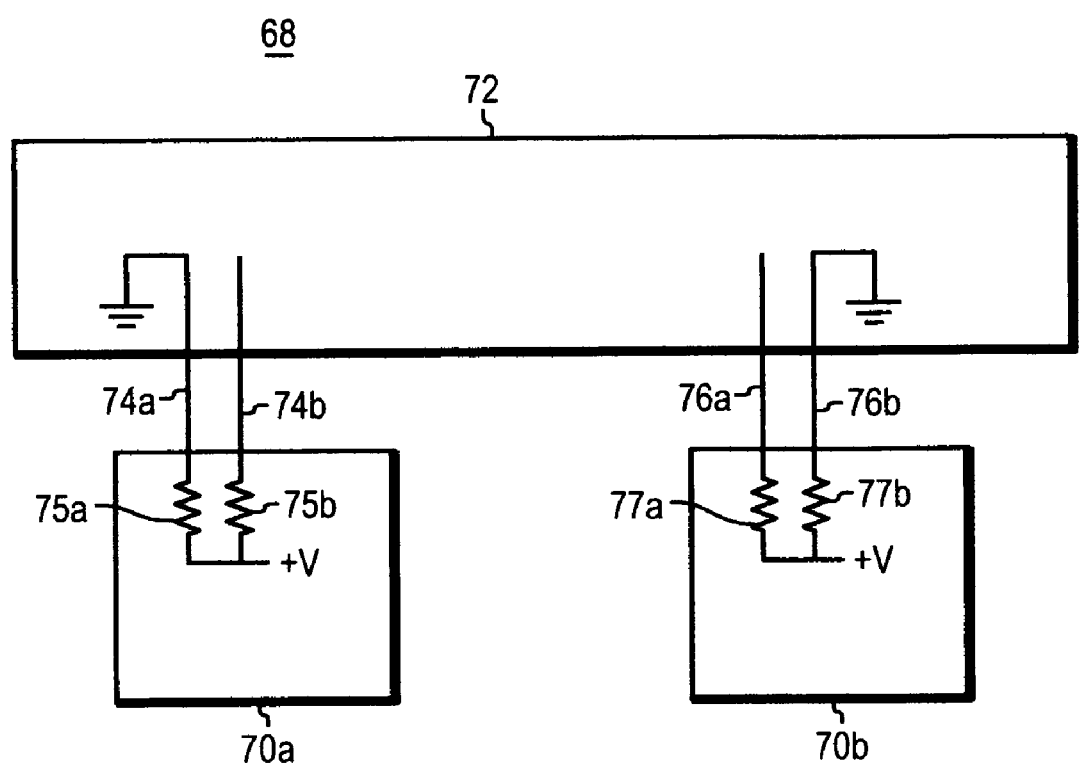
FIG. 4 is a block diagram of a system incorporating highly available board identification in accordance with the invention.

In the example of FIG. 4, a system 68 includes two boards 70a and 70b coupled to a midplane 72. Instead of providing just one pulled up identifying signal line on each board, two pulled up identifying signal lines are provided. Identifying signal lines 74a and 74b, pulled up by resistors 75a and 75b are provided on board 70a. Identifying signal lines 76a and 76b, pulled up by resistors 77a and 77b are provided on board 70b. The identifying signals are coupled to the backplane such that board 70a is designated "01"—i.e. identifying signal 74a is grounded on the midplane 72, and board is designated "10"—i.e. identifying signal 76b is grounded on the midplane 72. The signal encodings "01" and "10" are considered valid states, while the signal encodings "00" and "11" are considered invalid states. The backplane signals may be coupled in a conventional manner to a register elsewhere in the system for reading by management software. So, if one identifying signal line on a board suffers a fault that causes it to become stuck in its incorrect state, one of the invalid states will be detected by the system 68. For example, if identifying signal 74b on board 70a becomes stuck low, the identifying signals 74a,b will be detected by the system as "00", an invalid state. In response to detection of an invalid state, the system can shut the board down, or it can assume the identity of the faulted board as it still reports a different ID than the properly reporting board. It is clear that this aspect of the invention can be implemented for any number of boards in a system, provided that the number of identifying signal lines encodes a number of states that exceed the number of boards that can be installed in the system.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes.

We claim:

1. Apparatus in a system comprising:
    a plurality of boards;
    a first set of identifying signals for identifying a first board of the plurality of boards, the first set of identifying signals capable of encoding a first valid state and one or more invalid states; and
    a second set of identifying signals for identifying a second board of the plurality of boards, the second set of identifying signals capable of encoding a second valid state and one or more invalid states;
    wherein if a fault occurs on any one identifying signal of the first set of identifying signals, an invalid state will be detected by the system, but the first board will remain properly identified;
    wherein the first set of identifying signals are binary identifying signals and the second set of identifying signals are binary signals; and
    wherein the fault is a stuck-bit fault.

2. The apparatus of claim 1 wherein the plurality is two.

3. The apparatus of claim 2 wherein the first set of identifying signals comprises a first set of two signals, and wherein the second set of identifying signals comprises a second set of two signals.

4. The apparatus of claim 1 wherein the stuck-bit fault is a condition in which the one binary identifying signal of the first set of binary identifying signals is stuck at a first voltage, the first voltage indicative of a binary value other than what the one binary identifying signal should be to be encode the first identification state.

5. A method for use in a system comprising:
    providing a plurality of boards;
    using a first set of identifying signals for identifying a first board of the plurality of boards, the first set of identifying signals capable of encoding a first valid state and one or more invalid states;
    using a second set of identifying signals for identifying a second board of the plurality of boards, the second set of identifying signals capable of encoding a second valid state and one or more invalid states; and
    if a fault occurs on any one identifying signal of the first set of identifying signals:
        detecting an invalid state by the system; and
        properly identifying the first board;
    wherein the first set of identifying signals are binary identifying signals and the second set of identifying signals are binary signals; and
    wherein the fault is a stuck-bit fault.

6. The method of claim 5 wherein the plurality is two.

7. The method of claim 6 wherein the first set of identifying signals comprises a first set of two signals, and wherein the second set of identifying signals comprises a second set of two signals.

8. The method of claim 5 wherein the stuck-bit fault is a condition in which the one binary identifying signal of the first set of binary identifying signals is stuck at a first voltage, the first voltage indicative of a binary value other than what the one binary identifying signal should be to be encode the first identification state.

9. The method of claim 5 wherein properly identifying the first board includes identifying the first board by assigning it a valid identification state not used by any of the other boards of the plurality of boards.

10. Apparatus comprising:
    a plurality of boards;
    a midplane having a first set of signal lines, the first set of signal lines including a central control signal line and a plurality of central function signal lines, the first set of signal lines coupling to each of the plurality of boards;

each board of the plurality of boards including:
a signal isolation portion;
control circuitry;
test circuitry; and
a local set of signal lines, the local set of signal lines including a local control signal line and a plurality of local function signal lines, wherein:
the local control signal line corresponds to the central control signal line, and the local control signal line couples to the central control signal line via the signal isolation portion; and
each local function signal line corresponds to a central function signal line of the plurality of central function signal lines of the first set of signal lines, and each local function signal line couples to its corresponding central function signal line via the signal isolation portion;
wherein the signal isolation portion is configured to:
assert a signal on a signal line of the local set of signal lines when a signal on a corresponding first signal line of the first set of signal lines is asserted; and
prevent a signal on a corresponding first signal line of the first set of signal lines from becoming asserted in response to a signal on a local signal line of the local set of signal lines becoming asserted; and
wherein the control circuitry is configured to direct the test circuitry to perform a particular test function associated with a particular local function signal line, there being a one-to-one correspondence between each local function signal line and each test function that may be performed on the board, when a signal on that local function signal line is asserted and a signal on the local control signal line is asserted.

11. Apparatus as in claim 10 wherein the test circuitry of each board of the plurality of boards is configured to perform a voltage margining test function in response to a signal on the local control signal line and a signal on one particular local function signal line being asserted.

12. Apparatus as in claim 10 wherein the control circuitry on each board of the plurality of boards is further configured to report a fault when a signal on a local function signal line is asserted but a signal on the local control signal line is not asserted.

13. A method comprising:
connecting a midplane to a plurality of boards with a first set of signal lines, the first set of signal lines including a central control signal line and first a plurality of central function signal lines, the first set of signal lines coupling to each of the plurality of boards, wherein:
each board of the plurality of boards includes a signal isolation portion, test circuitry, and a local set of signal lines, the local set of signal lines including a local control signal line and local function signal lines; and
connecting the midplane to the plurality of boards includes coupling, on each board of the plurality of boards:
the local control signal line to the central control signal line via the signal isolation portion, the local control signal line corresponding to the central control signal line; and each local function signal line to a central function signal line of the plurality of central function signal lines of the first set of signal lines via the signal isolation portion, each local function signal line corresponding to the central function signal line to which it is connected;
asserting a signal on a signal line of the local set of signal lines when a signal on a corresponding first signal line of the first set of signal lines is asserted;
preventing a signal on a corresponding first signal line of the first set of signal lines from becoming asserted in response to a signal on a local signal line of the local set of signal lines becoming asserted; and
directing the test circuitry to perform a particular test function associated with a particular local function signal line, there being a one-to-one correspondence between each local function signal line and each test function that may be performed on the board, when a signal on that local function signal line is asserted and a signal on the local control signal line is asserted.

14. A method as in claim 13 wherein the method further comprises performing a voltage margining test function in the test circuitry of each board of the plurality of boards in response to a signal on the local control signal line and a signal on one particular local function signal line being asserted.

15. A method as in claim 13 wherein the method further comprises reporting a fault when on any board of the plurality of boards a signal on a local function signal line is asserted but a signal on the local control signal line is not asserted.

16. Apparatus in a system comprising:
a plurality of boards;
a first set of binary identifying signals for identifying a first board of the plurality of boards, the first set of binary identifying signals capable of digitally encoding a first valid identification state and one or more invalid states;
a second set of binary identifying signals for identifying a second board of the plurality of boards, the second set of binary identifying signals capable of digitally encoding a second valid identification state and one or more invalid states;
wherein if a stuck-bit fault occurs on any one binary identifying signal of the first set of binary identifying signals, an invalid state will be detected by the system, but the first board will remain properly identified.

17. The apparatus of claim 16 wherein the stuck-bit fault is a condition in which the one binary identifying signal of the first set of binary identifying signals is stuck at a first voltage, the first voltage indicative of a binary value other than what the one binary identifying signal should be to be encode the first identification state.

18. A method for use in a system comprising:
providing a plurality of boards;
using a first set of binary identifying signals for identifying a first board of the plurality of boards, the first set of binary identifying signals capable of digitally encoding a first valid identification state and one or more invalid states;
using a second set of binary identifying signals for identifying a second board of the plurality of boards, the second set of binary identifying signals capable of digitally encoding a second valid identification state and one or more invalid states; and if a stuck-bit fault occurs on any one binary identifying signal of the first set of binary identifying signals:
   detecting an invalid state by the system; and
   properly identifying the first board.

19. The method of claim 18 wherein the stuck-bit fault is a condition in which the one binary identifying signal of the first set of binary identifying signals is stuck at a first voltage, the first voltage indicative of a binary value other than what the one binary identifying signal should be to be encode the first identification state.

20. The method of claim 18 wherein properly identifying the first board includes identifying the first board by assigning it a valid identification state not used by any of the other boards of the plurality of boards.

* * * * *